United States Patent
Park et al.

(10) Patent No.: US 8,284,279 B2
(45) Date of Patent: Oct. 9, 2012

(54) METHOD OF MULTISPECTRAL IMAGING AND AN APPARATUS THEREOF

(76) Inventors: Jong-Il Park, Seoul (KR); Moon Hyun Lee, Ulsan (KR); Michael Grossberg, New York, NY (US); Shree K. Nayar, New York, NY (US)

(*) Notice: Subject to any disclaimer, the term of this patent is extended or adjusted under 35 U.S.C. 154(b) by 342 days.

(21) Appl. No.: 12/525,059

(22) PCT Filed: Jan. 29, 2008

(86) PCT No.: PCT/KR2008/000536
§ 371 (c)(1),
(2), (4) Date: Nov. 25, 2009

(87) PCT Pub. No.: WO2008/093988
PCT Pub. Date: Aug. 7, 2008

(65) Prior Publication Data
US 2010/0073504 A1    Mar. 25, 2010

(51) Int. Cl.
H04N 9/07 (2006.01)
H04N 9/04 (2006.01)
(52) U.S. Cl. ............ 348/266; 348/261; 348/210.99
(58) Field of Classification Search .......... 348/261, 348/265, 266, 310.1, 370, 70, 210.99, 310; 250/203.2, 205, 226, 550, 552, 559.05–559.08, 250/559.46, 582–584; 382/162
See application file for complete search history.

(56) References Cited

U.S. PATENT DOCUMENTS
6,839,088 B2   1/2005   Dicarlo et al. ............. 348/370
(Continued)

FOREIGN PATENT DOCUMENTS
JP    2001-078202    3/2001
(Continued)

OTHER PUBLICATIONS

Kimachi, A.; Ikuta, H.; Fujiwara, Y.; Masumoto, M.; "AM-coded spectral matching imager using multispectral LED illumination", SICE 2003 Annual Conference in Fukui, Aug. 4-6, 2003. pp. 807-812 vol. 1.

(Continued)

Primary Examiner — Lin Ye
Assistant Examiner — Euel Cowan
(74) Attorney, Agent, or Firm — Hayes Soloway P.C.

(57) ABSTRACT

A multispectral imaging method and system is provided. A multispectral imaging method of the present invention includes determining an on-off combination of a plurality of light sources illuminating a scene; illuminating the scene with the light sources according to the on-off combination selected on the basis of a first control signal generated by a microcontroller; capturing an image of the scene by operating a camera on the basis of a second control signal synchronized with the first control signal; determining a plurality of spectral basis functions and weights of the spectral basis functions; and acquiring a continuous spectral reflectance by summing values obtained by multiplying the spectral basis functions and respective weights. The multispectral imaging method of the present invention is practical and efficient in that a continuous spectral reflectance image can be acquired with a minimized number of measurements required for obtaining spectral reflectance. Accordingly, the multispectral imaging method of the present invention can be applied to various fields, such as image reproduction and medical imaging, while overcoming performance limits of the conventional RGB imaging techniques.

18 Claims, 13 Drawing Sheets

U.S. PATENT DOCUMENTS

| | | | |
|---|---|---|---|
| 7,002,624 B1 | 2/2006 | Uchino et al. | 348/225.1 |
| 7,889,919 B2 | 2/2011 | Komiya et al. | 382/162 |
| 2002/0174210 A1* | 11/2002 | Halcomb et al. | 709/223 |
| 2003/0185438 A1* | 10/2003 | Osawa et al. | 382/162 |
| 2004/0125205 A1 | 7/2004 | Geng | |
| 2006/0276966 A1* | 12/2006 | Cotton et al. | 702/1 |
| 2007/0060810 A1* | 3/2007 | Higgins | 600/328 |
| 2008/0137941 A1* | 6/2008 | Tin | 382/162 |

FOREIGN PATENT DOCUMENTS

WO    WO 2004/012461    2/2004

OTHER PUBLICATIONS

Office Action issued in corresponding Japanese application No. 2009-548154 on Jul. 9, 2012, with English translation, 5 pgs.

* cited by examiner

[Figure 1]
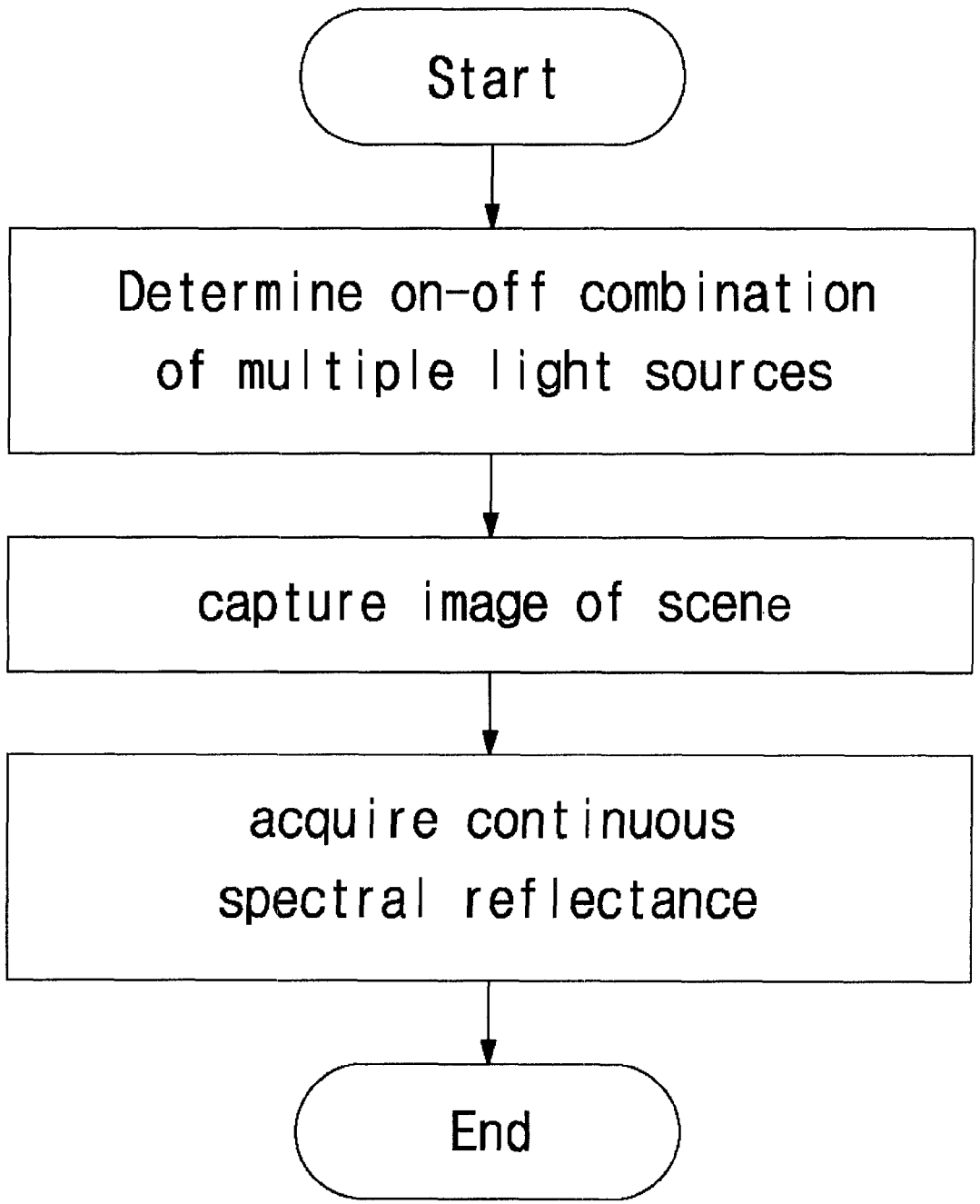

[Figure 2]
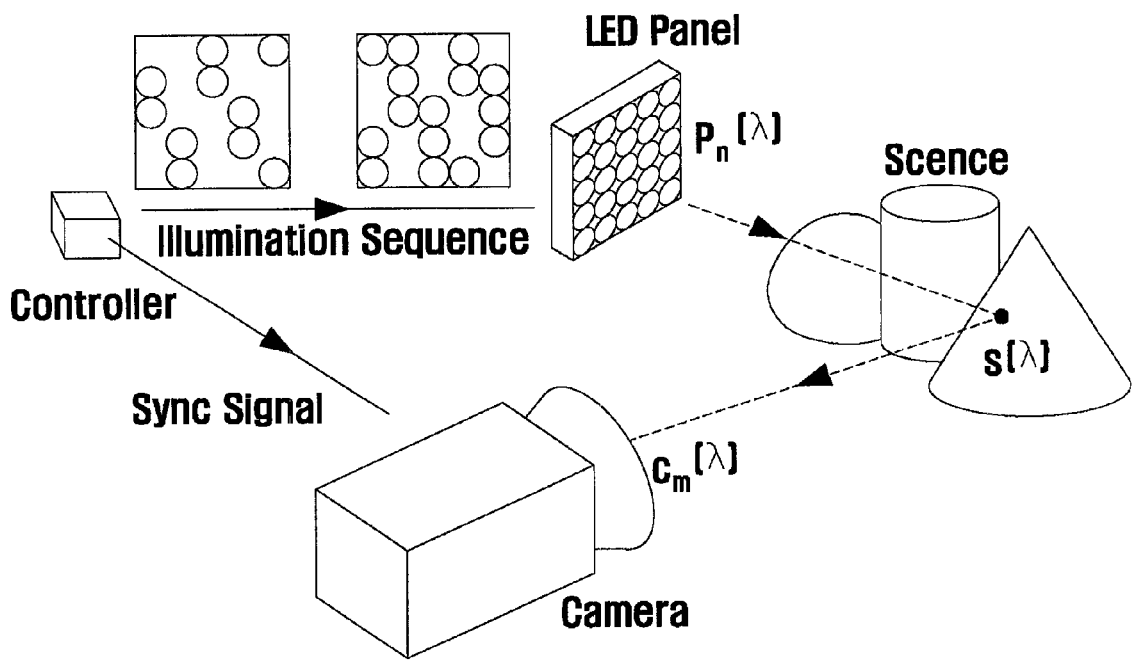

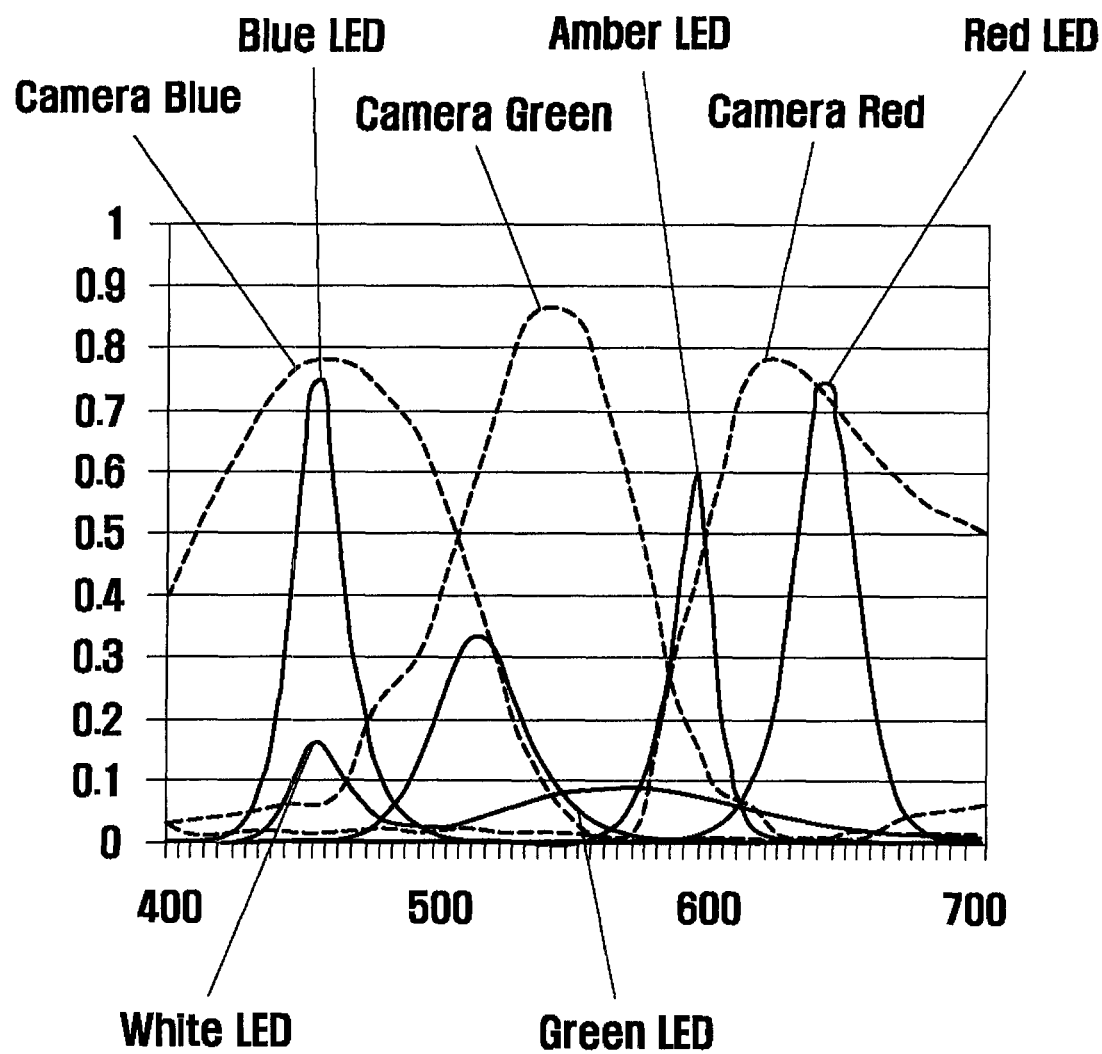
[Figure 3]

[Figure 4]
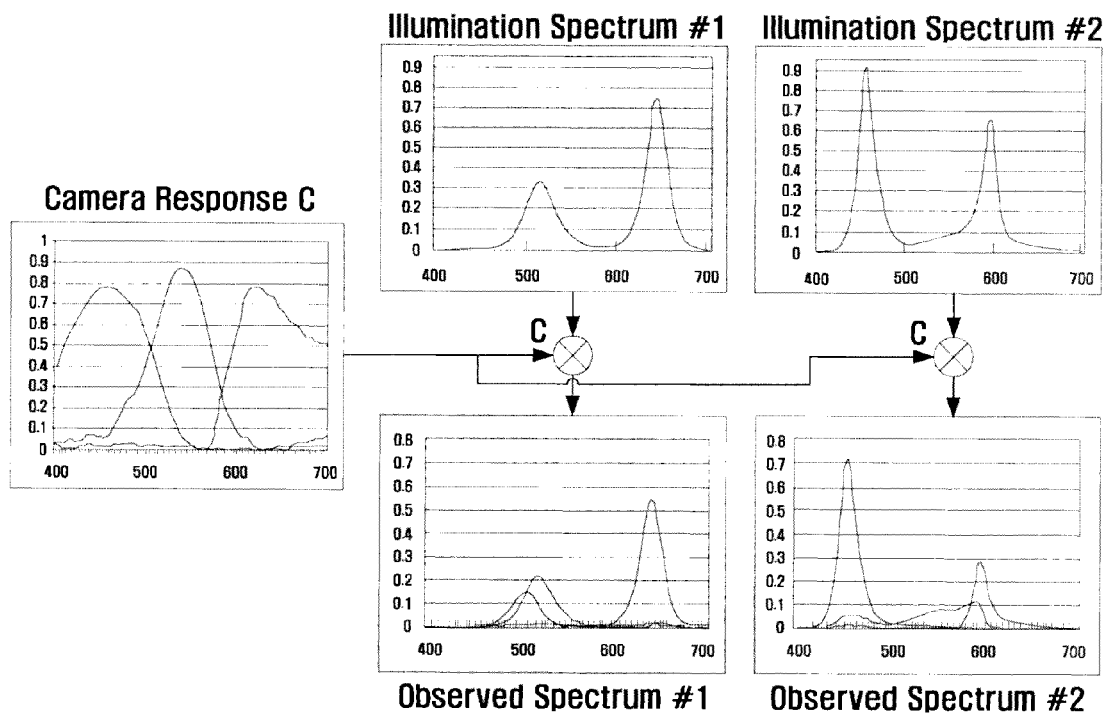
[Figure 5]
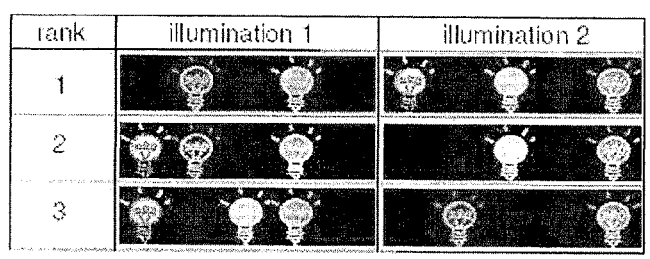

[Figure 6]
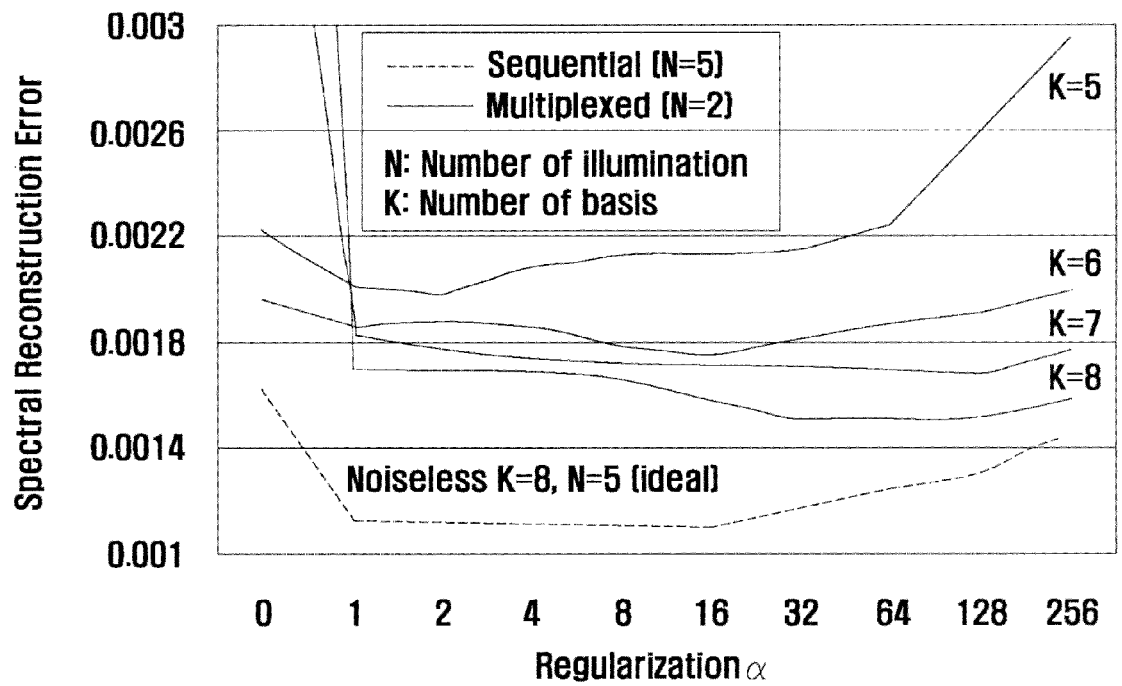
[Figure 7]
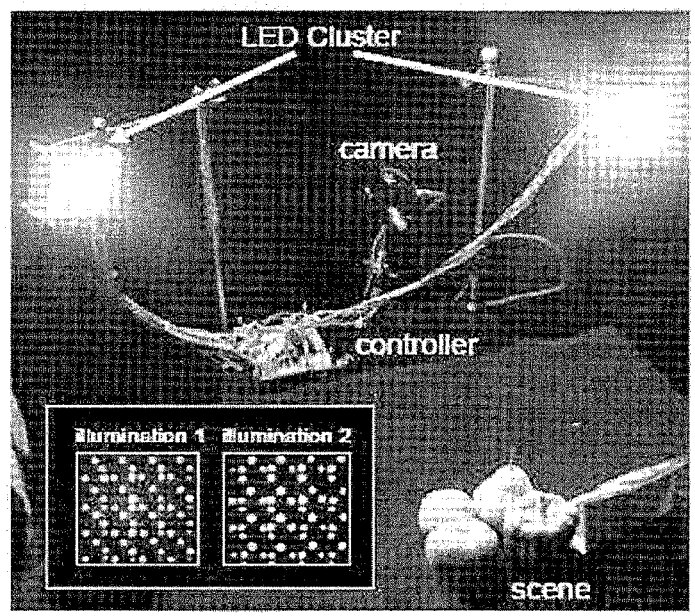

【Figure 8】
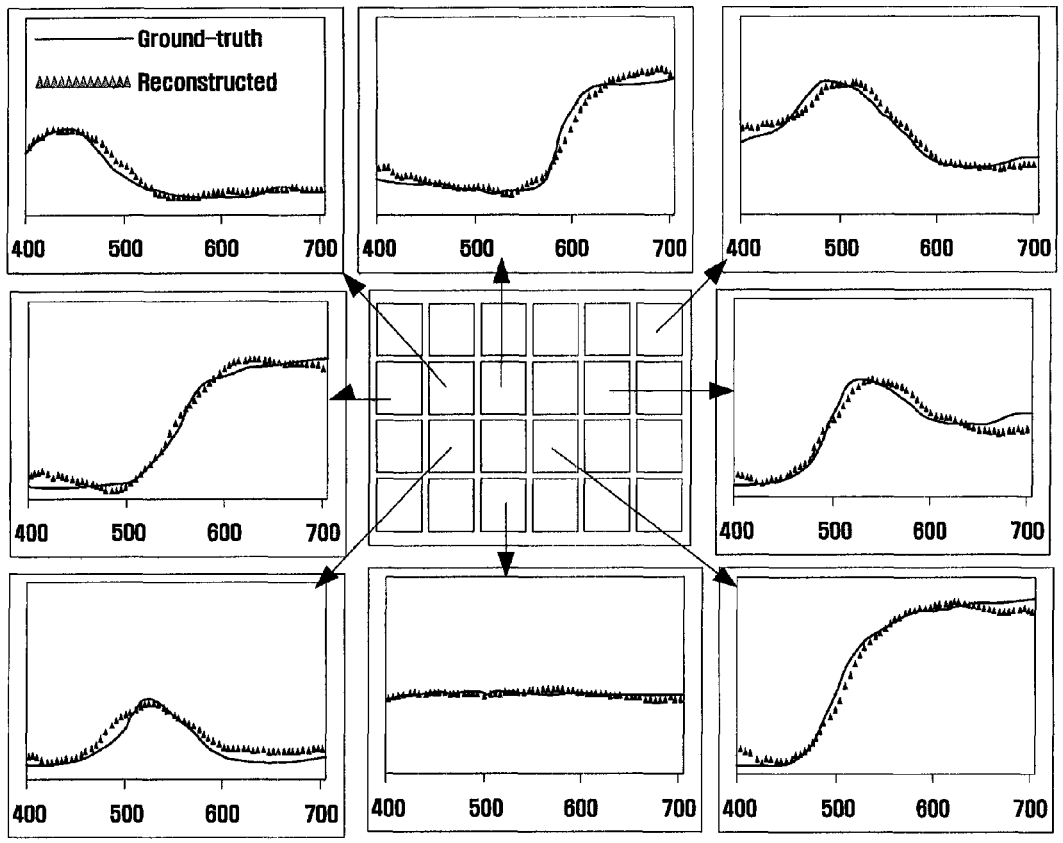
【Figure 9】
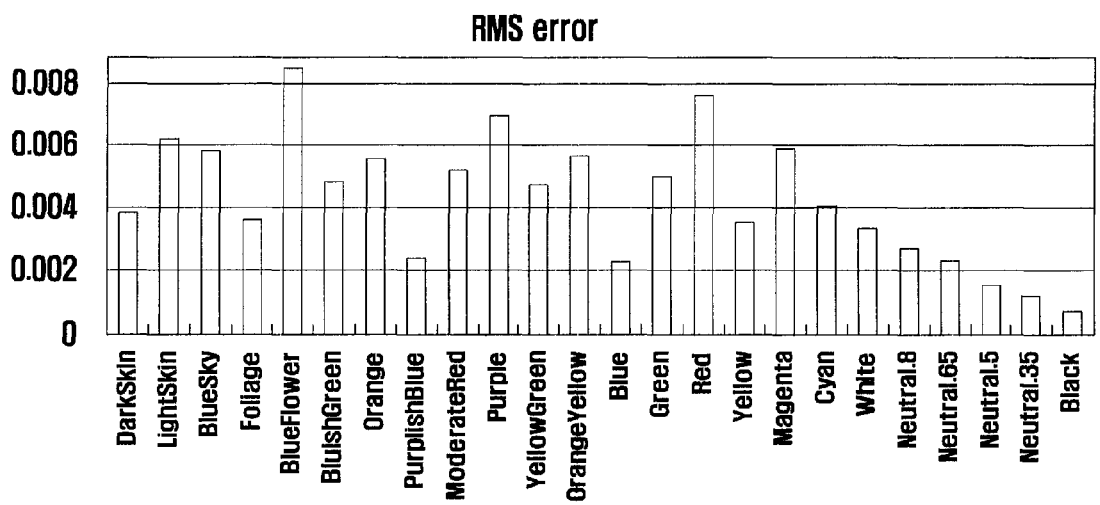

[Figure 10]
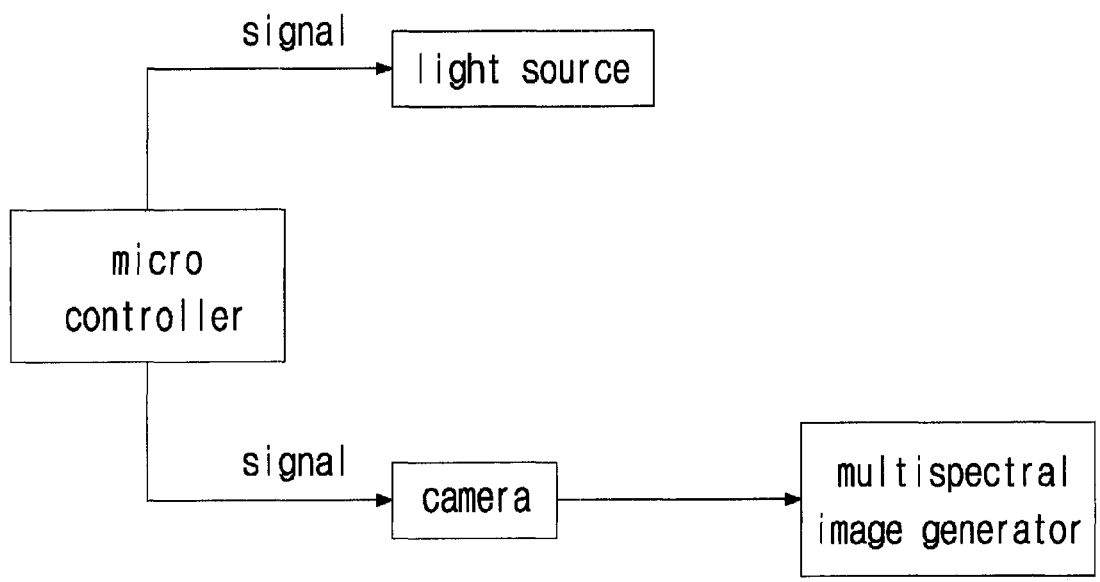
[Figure 11]
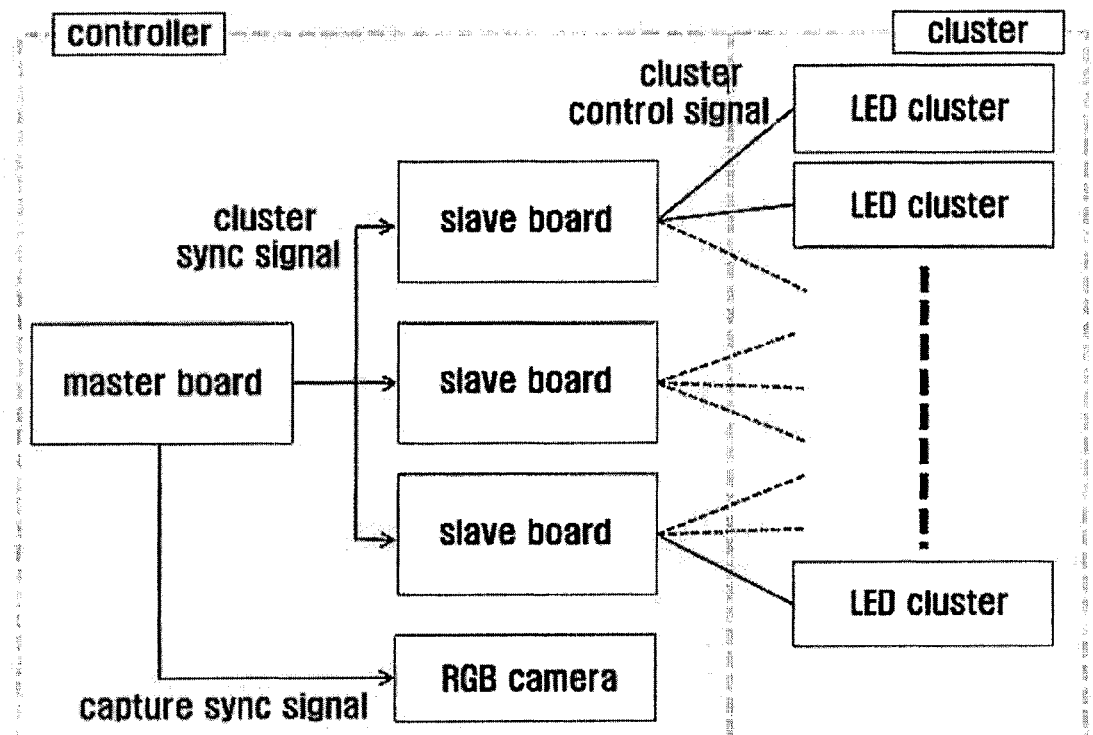

【Figure 12】
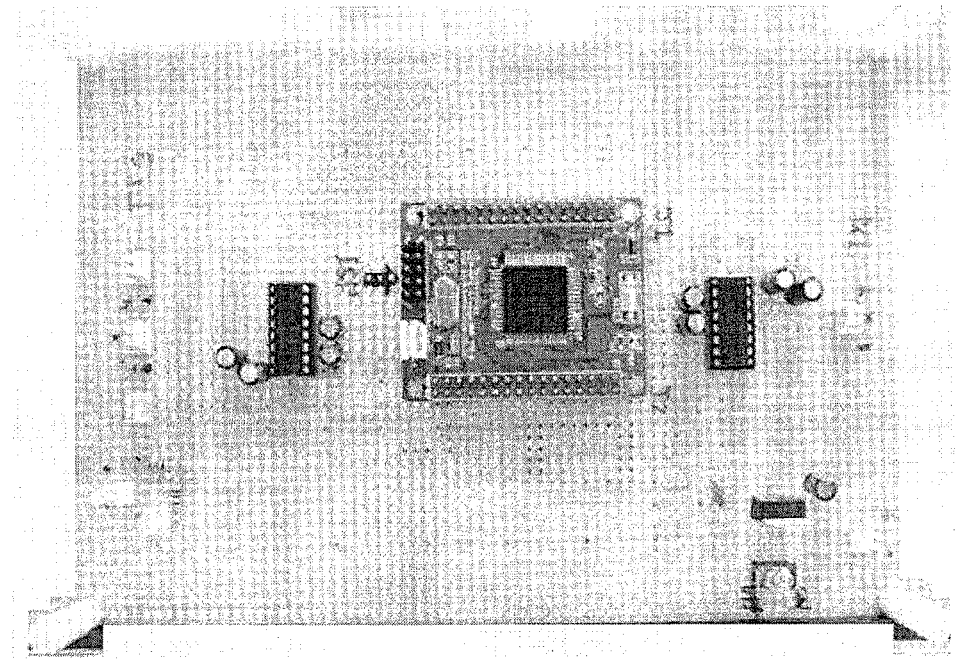
【Figure 13】
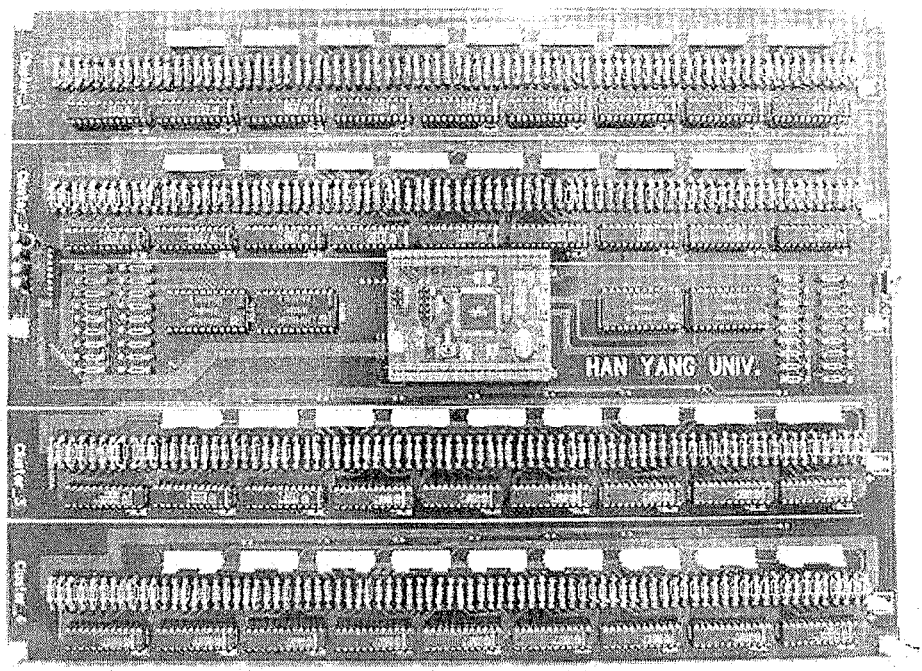

[Figure 14]

16 bit instruction

| Controller ID | Cluster ID | PWM value |
|---|---|---|
| 4 bit | 4 bit | 8 bit |

[Figure 15]

| L1 | L2 | L3 | L1 | L2 | L3 | L1 | L2 | L3 |
|---|---|---|---|---|---|---|---|---|
| L4 | L5 | L6 | L4 | L5 | L6 | L4 | L5 | L6 |
| L7 | L8 | L9 | L7 | L8 | L9 | L7 | L8 | L9 |
| L1 | L2 | L3 | L1 | L2 | L3 | L1 | L2 | L3 |
| L4 | L5 | L6 | L4 | L5 | L6 | L4 | L5 | L6 |
| L7 | L8 | L9 | L7 | L8 | L9 | L7 | L8 | L9 |
| L1 | L2 | L3 | L1 | L2 | L3 | L1 | L2 | L3 |
| L4 | L5 | L6 | L4 | L5 | L6 | L4 | L5 | L6 |
| L7 | L8 | L9 | L7 | L8 | L9 | L7 | L8 | L9 |

(P1, P2, P3, P4, P5, P6, P7, P8, P9)

[Figure 16]
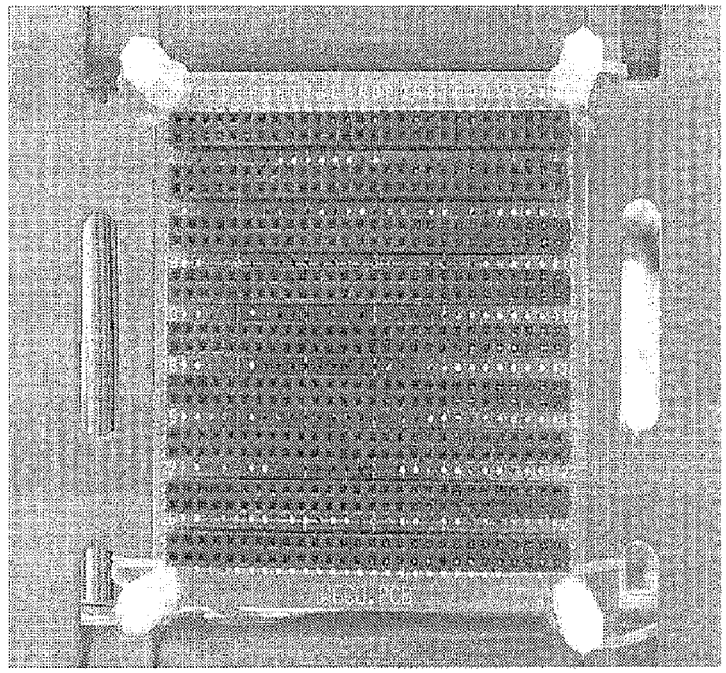
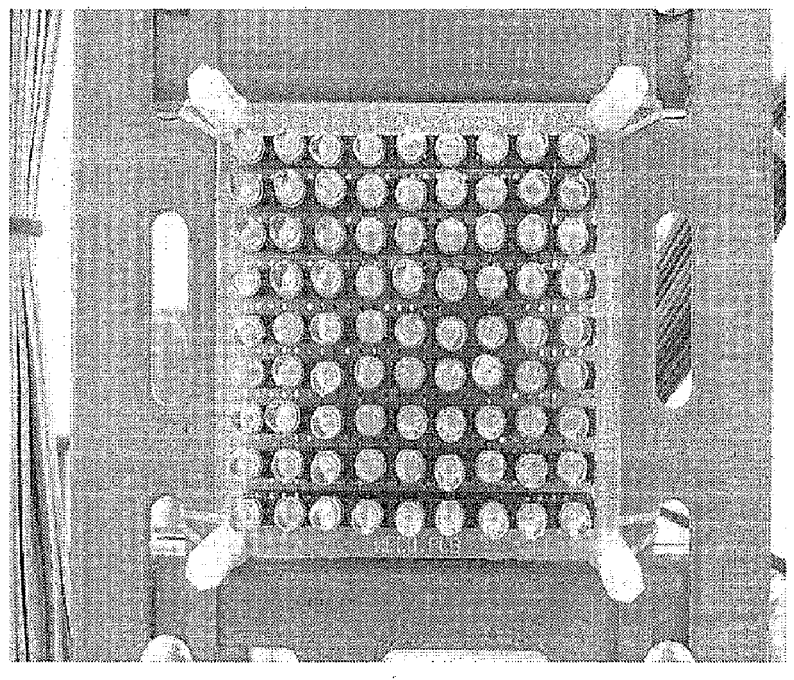

[Figure 17]
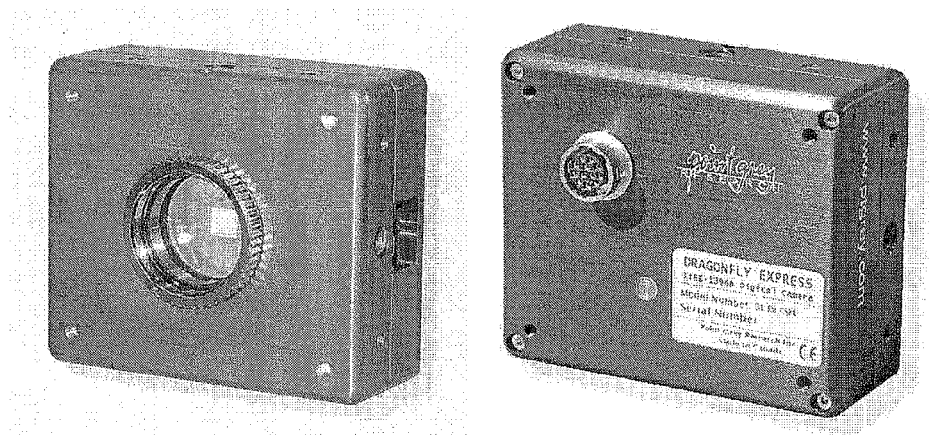
[Figure 18]
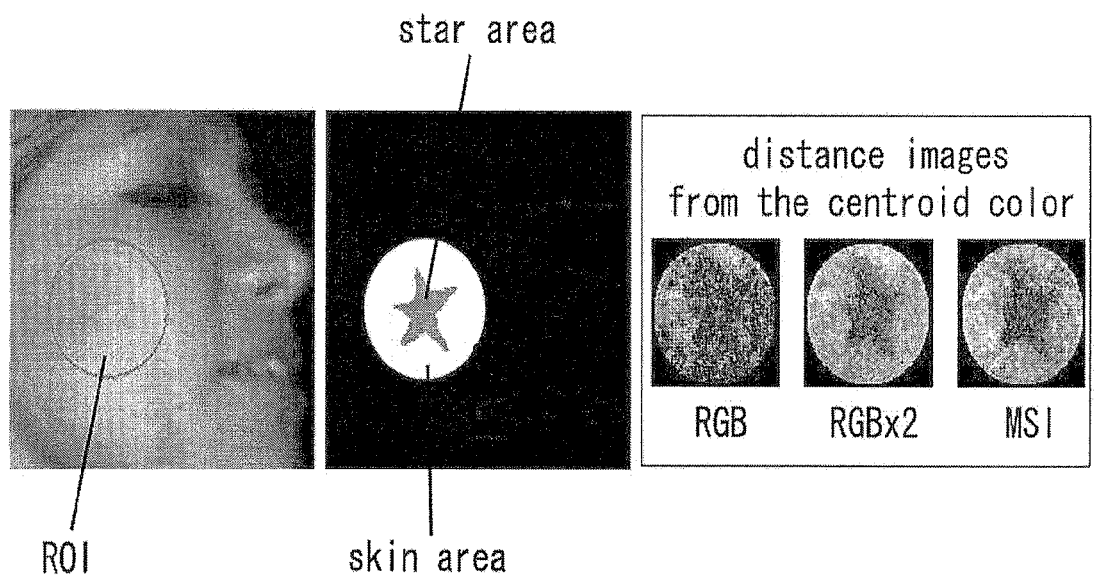

[Figure 19]
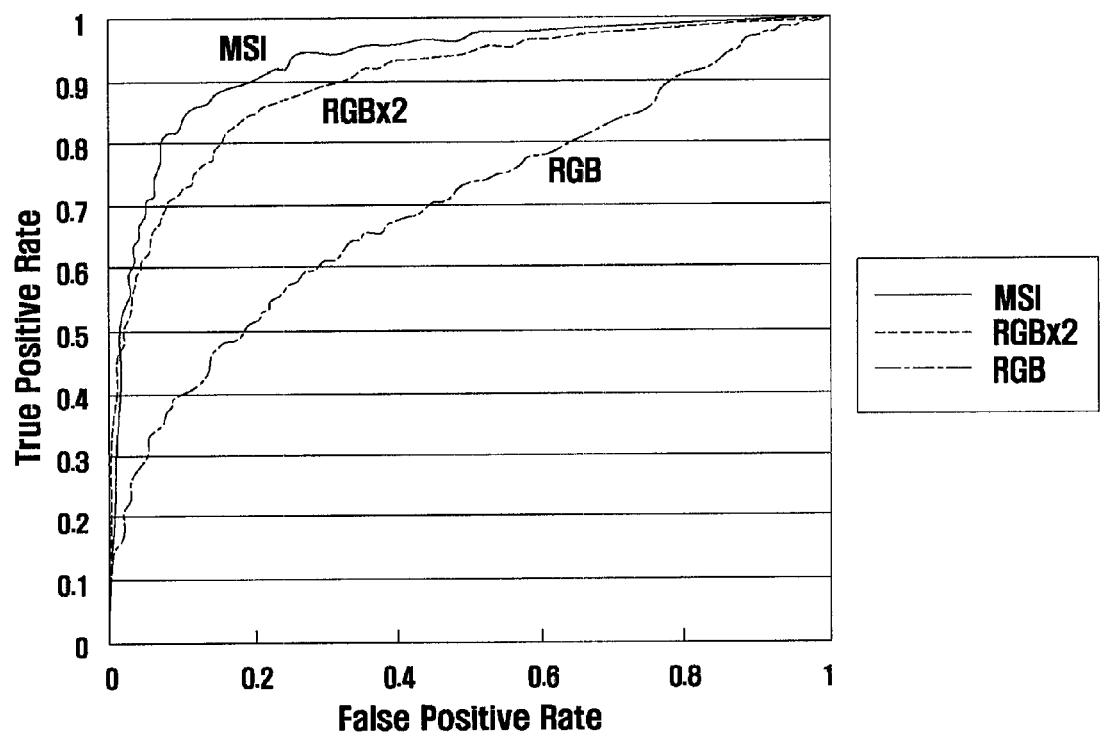

[Figure 20]
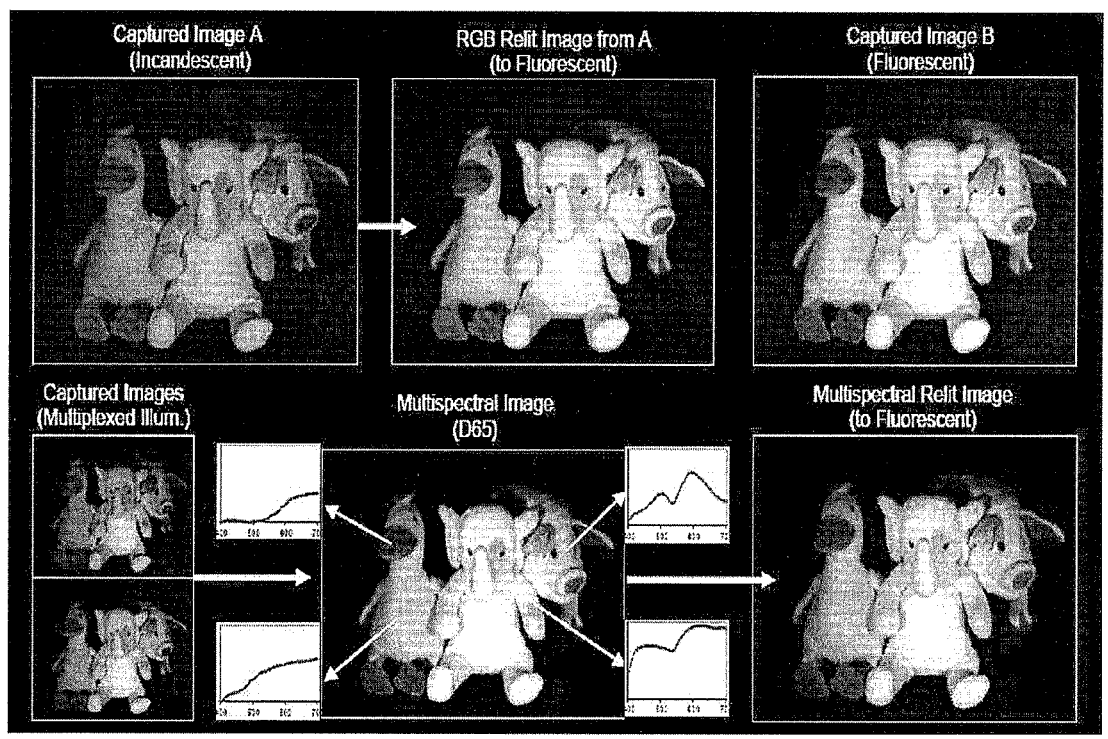

METHOD OF MULTISPECTRAL IMAGING AND AN APPARATUS THEREOF

TECHNICAL FIELD

The present invention relates to a multispectral imaging and, in particular, to a multispectral imaging method and system that is capable of obtaining a continuous spectral reflectance image with an efficient and simple structure and a relatively small number of frames.

BACKGROUND ART

Typically, an object shows slight variations in its color and appearance due to the variations of material composition or compound of different scene elements, and the capability of detecting such variations is one of the important factors for an image pickup system. In fields such as medical imaging, automatic inspection, and remote sensing, particularly, various imaging methods have been developed to detect anomalies such as, respectively, skin disease, food contamination, and deforestation using specific devices sensitive to corresponding spectral variations in surface reflectance.

However, recovery of surface reflection is impossible exclusively with conventional RGB cameras, since the appearance of a captured image depends on both the illumination spectrum and the spectral reflectance of the object in the scene. This is because, even if the illumination spectrum is known, an RGB camera provides only 3 measurements (Red, Green, and Blue) that are insufficient to recover the spectral reflectance. For this reason, conventional RGB-based computer-aided imaging devices and graphic techniques, implemented on the basis of the sum of simplified spectral weights of RGB rather than real colors, are limited in color expressions, whereby, it is known that the RGB-based imaging techniques inferior to the multispectral imaging techniques in color expression performance and applicability to variant illumination environments or media. Also, in a metameric environment in which some colors are not distinctive from each other, RGB imaging techniques are likely to ignore useful information.

In order to solve these problems, a wide variety of methods have been developed for estimating the spectral reflectance of a scene. For a static scene with fixed illumination, the spectral sensitivity of the camera can be varied over time such that, if the illumination spectrum is known, the multispectral reflectance of the scene can be determined. In the case of a dynamic scene, however, the spectral reflectance must be measured with high temporal resolution. Unfortunately, there exist no methods for capturing multispectral videos in real-time.

Instead of obtaining the spectral reflectance exclusively with a multispectral camera and a fixed illumination, the spectrum of the illumination can be modulated temporally, to provide a multispectral light source. Illumination spectrum modulation is advantageous since it is easier to create an illumination source with rapidly changing spectra than a camera with rapidly changing spectral sensitivity. Also, if there are M camera channels and N spectrally distinct illuminations, the number of effective channels is MN. This multiplicative effective dramatically increases the number of independent measurements with a minor increase in system complexity. Even in this case, in order to obtain a multispectral illumination to a dynamic scene, a large number of channels are required, resulting in an increase of M.

As described above, conventional multispectral imaging methods obtain multispectral illumination by changing the spectral sensitivity of the camera or the illumination spectrum. However, these conventional methods have drawbacks in that varying either the spectral sensitivity of the camera or the illumination typically comes at the cost of lowering the spatial resolution or the frame rate of the acquired data.

Accordingly, there has been a need for a novel multispectral imaging technique that is capable of obtaining multispectral image without a cost of lowering spatial resolution and frame rate.

DISCLOSURE

Technical Problem

The present invention has been made in an effort to solve the above problems, and it is an object of the present invention to provide a multispectral imaging method and system that are capable of obtaining an image with simplified system complexity while overcoming the performance limits of conventional RGB imaging techniques.

It is another object of the present invention to provide a multispectral imaging method and system that are capable of obtaining an image without a cost of lowering spatial resolution and frame rate.

Technical Solution

In accordance with an aspect of the present invention, the above and other objects are accomplished by a multispectral imaging method. The multispectral imaging method includes determining an on-off combination of a plurality of light sources illuminating a scene; illuminating the scene with the light sources according to the on-off combination selected on the basis of a first control signal generated by a microcontroller; capturing an image of the scene by operating a camera on the basis of a second control signal synchronized with the first control signal; determining a plurality of spectral basis functions and weights of the spectral basis functions; and acquiring a continuous spectral reflectance by summing values obtained by multiplying the spectral basis functions and respective weights.

Preferably, the weights are determined using spectra to known spectral response characteristics of a camera and the plurality of lights sources, and the spectral basis functions are eigenvectors of a correlation matrix derived from a database of spectral reflectances of Munsell color chips.

Preferably, the light sources constitutes at least one light-emitting diode cluster, and the continuous spectral reflectance is calculated by an equation:

$$s(\lambda) = \sum_{k=1}^{K_s} \sigma_k b_k(\lambda) \quad (1)$$

where $s(\lambda)$ is the continuous spectral reflectance, $\sigma_k$ indicates the weights, $b(\lambda)$ indicates the spectral basis functions, and $K_s$ is a number of the spectral basis functions.

Preferably, the on-off combination of the light sources to be illuminated to the scene is determined by a weight matrix minimizing offset of a spectral reflectance of a predetermined representative material to the spectral basis functions, camera channel, spectra of the light sources, and number of frames (N).

Preferably, the light sources are characterized in that spectral response of each camera channel overlaps with at least one light source, the spectrum of the illumination is different for the frames, and a total power of illumination in a frame is comparable to that obtained when half the light sources are on.

In accordance with another aspect of the present invention, the above and other objects are accomplished by a multispectral imaging system. The multispectral imaging system includes a microcontroller which generates an on-off control signal indicating an on-off combination of light sources illuminating a scene and generates an operation control signal in synchronization with the on-off control signal; a plurality of light sources that turn on according to the on-off combination indicated by the on-off control signal to illuminate the scene; a camera which captures an image of the scene on the basis of the operation control signal; and a multispectral image generator which determines a plurality of spectral basis functions and weights of the spectral basis functions, and acquires a continuous spectral reflectance by summing values obtained by multiplying the spectral basis functions and respective weights.

Preferably, the microcontroller includes a light-emitting diode controller having a master board and at least one slave board, the master board controlling the slave board by processing the user input, and the slave board controlling on/off of the light sources according to control signals generated by the master board.

Preferably, the light sources constitutes at least one light-emitting diode cluster, and the camera includes at least one RGB camera.

Preferably, the spectral basis functions are eigenvectors of a correlation matrix derived from a database of spectral reflectances of Munsell color chips, and the light sources are characterized in that spectral response of each camera channel overlaps with at least one light source, the spectrum of the illumination is different for the frames, and a total power of illumination in a frame is comparable to that obtained when half the light sources are on.

Advantageous Effects

The multispectral imaging method of the present invention is practical and efficient in that a continuous spectral reflectance image can be acquired with a minimized number of measurements required for obtaining spectral reflectance. Accordingly, the multispectral imaging method of the present invention can be applied to various fields, such as image reproduction and medical imaging, while overcoming performance limits of the conventional RGB imaging techniques.

BEST MODE

In order to overcome the shortcomings of the conventional multispectral imaging system, the present invention decreases a number of measurements for obtaining the spectral reflectance. The number of measurements can be reduced in two ways: first by using several sources with different spectra, and second using a finite number of spectral measurements to recover a continuous spectral reflectance. In the former method, rather than sequentially activating the sources as in the conventional method, an optimal way is proposed for multiplexing the sources so as to minimize the number of images acquired while maintaining high signal-to-noise ratio. In either way, a video-rate multispectral imaging system is implemented.

That is, the multispectral imaging method of the present invention recovers the continuous spectral reflectance for each scene point by using a linear model for spectral reflectance.

DESCRIPTION OF DRAWINGS

FIG. 1 is a flowchart illustrating a multispectral imaging method according to an exemplary embodiment of the present invention;

FIG. 2 is a conceptual view illustrating a multispectral imaging system according to an exemplary embodiment of the present invention;

FIG. 3 is a graph illustrating a source spectral power and spectral response characteristics of the multispectral imaging method according to an exemplary embodiment of the present invention;

FIG. 4 is a graphical diagram illustrating spectral illuminations and corresponding spectra sensed by a camera according to an exemplary embodiment of the present invention;

FIG. 5 is a conceptual view illustrating multiple illumination combination with which a reconstructed continuous spectral reflectance shows least error;

FIG. 6 is a graph illustrating variations of RMS error having continuous spectral reflectance;

FIG. 7 is a photograph illustrating a multispectral imaging system according to an exemplary embodiment of the present invention;

FIG. 8 is a graphical diagram illustrating spectral reflectances of color chips on the Macbeth chart measured using multiplexed illumination;

FIG. 9 is a graph illustrating average reconstruction errors in RMS for Macbeth chart;

FIG. 10 is a schematic block diagram illustrating a multispectral imaging system according to an exemplary embodiment of the present invention;

FIG. 11 is a block diagram illustrating a configuration of a multispectral imaging system according to an embodiment of the present invention;

FIG. 12 is a photograph illustrating a master board of FIG. 11;

FIG. 13 is a photograph illustrating a slave board of FIG. 11;

FIG. 14 is a data format exchanged between mast and slave board by means of a serial communication unit according to an exemplary embodiment of the present invention;

FIG. 15 is a diagram illustrating an LED cluster according to an exemplary embodiment of the present invention;

FIG. 16 is a photograph illustrating an LED cluster fabricated according to an exemplary embodiment of the present invention;

FIG. 17 is a photograph illustrating an RGB camera of the multispectral imaging system according to an exemplary embodiment of the present invention;

FIG. 18 is a photograph illustrating metameric distinguishability of the multispectral imaging system according to an exemplary embodiment of the present invention;

FIG. 19 is a graph illustrating a receiver operating characteristic (ROC) curves for separation of metameric appearance using multispectral imaging system according to an exemplary embodiment of the present invention; and FIG. 20 is a photograph illustrating a relighting effect of the multi spectral imaging system according to an exemplary embodiment of the present invention.

DETAILED DESCRIPTION

FIG. 1 is a flowchart illustrating a multispectral imaging method according to an exemplary embodiment of the present invention.

Referring to FIG. 1, an optimal on-off combination of the multiple illumination spectra, that can recover the continuous spectral reflectance, is determined to the multiple illumination sources with distinct spectra so as to minimize the difference of the recovered continuous spectral reflectance. Using the combination, the operation sequence of the given numbers of illumination spectra is determined such that the difference of the recovered continuous spectral reflectance can be minimized. In this step, the multiple illumination spectra are optimized for obtaining the multiple spectra.

Next, an image of the object is acquired using the optimized multiple illumination spectra. In an embodiment of the present invention, the image of the object is obtained using multiple RGB cameras operating according to on signals synchronized with on-off signals of the multiple illumination sources, and the continuous spectral reflectance is recovered from the image obtained by the RGB cameras. In more detail, the multispectral imaging method according to an exemplary embodiment is implemented according to the following.

1. Optimization of Multiple Illumination Spectra Construction

As described above, a multiplexing sequence of the sources that minimizes least squares error is determined for a given set of sources with distinct spectra (some may narrow and others may wide) and the number of allowable measurements.

2. Model-Based Spectral Reconstruction

A simple and empirical linear model is applied for estimating the full spectral reflectance at each pixel from the small number of multiplexed measurements. Since the model is linear, the reconstruction is efficient and stable.

3. Multispectral Imaging System

A practical low-cost system that is capable of capturing multispectral videos at 30 fps is proposed. The system uses off-the-shelf components, including a commodity RGB video camera and a set of Light Emitting Diode (LED) light sources. Although the RGB video camera and LEDs are disclosed in this embodiment, the present invention is not limited thereto. For example, the multispectral imaging system of the present invention can be implemented with any types of image measurement devices and light sources.

Although exemplary embodiments of the present invention are described hereinafter with reference to the accompanying drawings in detail, the present invention is not limited to such cases.

A multispectral video has two spatial dimensions, one spectral dimension and one temporal dimension. The multispectral video can be viewed as a 3 dimensional (3D) volume of measurements that varies with time. This 3D volume can be acquired using a wide variety of imaging devices. These devices differ in the mechanisms they use to separate, over space and/or time, the incoming light into its spectral components. This separation is done using prisms, diffraction gratings, tunable filters, or gen filters.

Existing systems differ in terms of how they trade off spatial and temporal resolution to obtain multispectral measurements for each point in the field of view.

For static scenes, the temporal dimension can be used to measure the spectrum. For example, a spectrometer can be used to measure the spectrum of a single point, and the entire field of view is scanned over time. Other devices capture a set of monochrome 2D images by changing the spectral sensitivity of the camera over time. A popular way of changing the spectral sensitivity is by using tunable filters. Some hybrid approaches can simultaneously scan a static scene with respect to space and spectrum by modifying a commodity camera. High-cost devices that use complex optics and custom photo-sensors have been developed for remote sensing that can acquire hyperspectral videos of dynamic scenes. All these conventional systems trade off temporal and/or spatial resolution to capture spectral information. A noteworthy approach that avoids this trade-off is the IRODORI system that can capture 6-band HDTV video using an optical splitter, color filters, and two RGB sensors. However, this system does not deal with how to recover the continuous spectrum from the 6 color measurements.

In the meantime, the multispectral imaging system according to an embodiment of the present invention uses spectral multiplexed illumination that is complementary to any multispectral camera. A spectrum reconstruction method is described hereinafter before explaining how to optimize the spectral multiplexed illumination.

Recovering reflectances from single illumination with ordinary RGB sensors has been proposed. However, since this reflectance recovery method is implemented on the basis of restrictive assumptions on surface reflectance, the achievable performance of reconstruction is limited.

In general, the space of spectral reflectance curves for natural materials can be well-approximated with a low dimensional linear model. A number of linear models have been proposed based on measured spectral reflectances. A few non-linear models have also been proposed. In this embodiment, the nonlinearities of the devices are explained by pre-calibrating them. While recovering the parameters of a linear model for spectral reconstruction, the constraint that spectral reflectance is positive should be enforced.

Model-Based Spectral Reconstruction

FIG. 2 is a conceptual view illustrating a multispectral imaging system according to an exemplary embodiment of the present invention.

Referring to FIG. 2, the scene is illuminated using a sequence of distinct multiplexed illuminations and an image is captured for each illumination using a synchronized RGB camera operating according to signals synchronized with on signals. If the number of color channels is M and the number of illuminations is N, a multiplexed multispectral image with MN channels is obtained.

In this embodiment, some assumptions are needed to reconstruct the full continuous spectral reflectance $s(\lambda)$ from images obtained a finite set of measurements (camera channels).

If the spectral curves are arbitrarily complex, MN must be large. However, in order to capture the spectral reflectance of dynamic scenes (at video rate) with a finite number of cameras, the number of multiplexed illuminations must be fairly small, for example, N=2 and M=3. Fortunately, the spectral reflectance of most real-world surfaces can be well-approximated using a low-parameter linear model. Such a linear model is the set of orthogonal spectral basis functions $b_k(\lambda)$ proposed by Parkkinen et al. These basis functions are eigenvectors of a correlation matrix derived from a database consisting of the measured spectral reflectances of 1257 Munsell color chips. Although the low-parameter linear model is used in this embodiment, the present invention is not limited thereto. For example, linear models showing various linear characteristics can be applied according to the feature of the target object.

In this embodiment, it is empirically known that this model gives fairly accurate spectral reconstructions for a wide range of real-world materials. The Model can be written as $$s(\lambda) = \sum_{k=1}^{K_s} \sigma_k b_k(\lambda), \quad (2)$$

where are $\sigma_k$ are scalar coefficients and $K_s$ is the number of parameters of the model. By substituting Equation (2) in Equation (1), Equation (3) is obtained as $$I_{mn} = \sum_{k=1}^{K_s} \sigma_k \int b_k(\lambda) c_m(\lambda) p_n(\lambda) d\lambda. \quad (3)$$

To estimate these parameters from a set of images, it is required to determine the spectral response $c_m(\lambda)$ of each of the camera's color channels and the spectrum $p_n(\lambda)$ of each of the multiplexed illuminations via calibration. This calibration is done using a spectrometer and known reflectance targets. The known quantities in Equation (3) can be absorbed into $MNK_s$ coefficients: $f_{mnk} = \int b_k(\lambda) c_m(\lambda) p_n(\lambda) d\lambda$. Equation (3) is rewritten in matrix form by substituting $f_{mnk}$ into Equation (4) as $$F\sigma = I. \quad (4)$$

When $F^T F$ is invertible, a least squares solution $\sigma = (F^T F)^{-1} F^T I$ is obtained. However, the least squares solution results in negative recovered spectral reflectance for some wavelengths. Therefore, in order to meet the requirement that spectral reflectance function should be positive, the following condition must be satisfied:

$$s(\lambda) = \sum_{k=1}^{K_s} \sigma_k b_k(\lambda) \geq 0, \quad (5)$$

To this end, the problem is reformulated as a constrained minimization as follows:

$$\sigma^+ = \arg\min_{\sigma} |F\sigma - I|^2, \text{ subject to } A\sigma \geq 0, \quad (6)$$

where $A_{lk} = b_k(\lambda_1)$ with $1 \leq l \leq L$ and $1 \leq k \leq K_s$. This optimization can be solved using quadratic programming. However, a solution to the constrained quadratic minimization in Equation (6) may not be numerically stable if F has a rank lower than $K_s$, or if F has a large condition number. In this case, it cannot be expected to obtain a reasonable solution without imposing further constraints. In this embodiment, a smoothness constraint is imposed since real-world spectral reflectances tend to be smooth. This is done by penalizing large values for the second derivative of the spectral reflectance with respect to $\lambda$:

$$\min_{\sigma} \left[ |F\sigma - I|^2 + \alpha \left| \frac{\partial^2 s(\lambda)}{\partial \lambda^2} \right| \right], \quad (7)$$

where $\alpha$ is a smoothness parameter. Then, the Equation (7) can be optimized as $$\min_{\sigma} |\tilde{F}\sigma - \tilde{I}|^2, \text{ subject to } A\sigma \geq 0, \quad (8)$$

where $\tilde{F} = [F^T \alpha P^T]^T$ with $P_{lk} = \partial^2 b_k(\lambda_l)/\partial \lambda^2$, $1 \leq l \leq L$, $1 \leq k \leq K_s$, and $\tilde{I} = [I^T \ 0]^T$. This regularized minimization can also be solved with quadratic programming. In this embodiment, quadrog routine of Matlab is used.

Both the numbers of parameters $K_s$ and $\alpha$ can be thought of as different ways to regularize the spectral recovery. $K_s$ conditions the recovery based on the empirical reflectances, while $\alpha$ simply forces the solution to be smooth (i.e., the reflectances does not to have excessively large value). By using a combination of both, a reasonable estimate of the full spectrum can be robustly recovered even with a small number of channels (M=3) and a small number of images (N=2).

Multiplexed Spectral Illumination

As described above, sequential activation of the sources is inefficient and capturing multispectral image at video rate requires a minimum number of distinct illumination. Moreover, to ensure that the measurements have a good signal-to-noise ratio, the irradiance received by the imager must be high. A method for finding distinct illuminations that satisfy these conditions is described hereinafter.

Finding the Multiplexed Illuminations

In order to effectively apply the multispectral imaging method according to an embodiment of the present invention, the spectral illumination should be rapidly varied. For this reason, a compound light source made up of many sources elements are required. Such a light source can be constructed as a cluster of Q types of sources, each type with a distinct spectral curve $I_q(\lambda)$. The illumination used for the $n^{th}$ captured image is weighted sum of the Q sources. The weights are denoted by $d_{nq}$, where $0 \leq d_{ng} \leq 1$. In this notation, $d_{11} = 0$ and $d_{11} = 1$ correspond to the sources of the first type being fully turned on and turned off in the first frame, respectively. The spectrum of the compound light source for frame n is $$p_n(\lambda) = \sum_{q=1}^{Q} d_{nq} I_q(\lambda). \quad (9)$$

If the above expression is substituted for $p_n$ in Equation (3), the measure value at a pixel for camera channel m and frame n can be written as $$I_{mn} = \int \sum_{k=1}^{K_s} \sigma_k b_k(\lambda) c_m(\lambda) \sum_{q=1}^{Q} d_{nq} I_q(\lambda) d\lambda \quad (10)$$

$$= \sum_{k=1}^{K_s} \sum_{q=1}^{Q} \sigma_K d_{nq} g_{kmq},$$

where $g_{mkq} = \int b_k(\lambda) c_m(\lambda) I_q(\lambda) d\lambda$. Note that $g_{mkq}$ does not depend on the scene or the illuminations used. In particular, for a given basis $\{b_k\}$, a set of camera channels $\{c_m\}$, a set of light source spectra $\{I_q\}$, and a fixed number of frames N, the weights $d = \{d_{ng}\}$, which minimize the errors in the reconstruction of a representative set of known spectral reflectances, can be found. In short, found is the optimal weights $d_{opt}$ given by $$\arg\min_{d_1,\Lambda,d_N} \sum_{e=1}^{E}\sum_{m=1}^{M}\sum_{n=1}^{N}\left[\sum_{k=1}^{K_s}\sum_{q=1}^{Q}\sigma_{k,e}d_{n,q}g_{kmq} - I_{mn,e}\right]^2 \quad (11)$$

where e is used to denote the representative materials and is the ideal image intensity for the material e. The solution depends on the representative materials used. In this embodiment, the known reflectance curves of common objects (available from NYU at http:www.cns.nyu.edu/ftp/ltm/SSR/) are used.

When $d_{nq}$ is an indicator variable (i.e., $d_{nq} \in \{0,1\}$), the source can only be fully on or fully off. In this case, $d_{opt}$ can be found using brute force search over all the variables. When the number Q of different types of sources is small, the search can be done in reasonable time. In this embodiment, the compound light source is a cluster of "white," "red," "amber," "green," and "blue" LEDs, i.e. Q=5. In order to determine the multiplexed illuminations, it is required to specify the camera responses $c_m$, the basis function $b_k$, and the number of acquired frames N. The power spectra of the five LEDs as well as the spectral responses of the camera's three channels (M=3) are shown in FIG. 3. For spectral reconstruction from the measured image brightnesses, the first 8 components of the Parkkinen basis ($K_s$=8) are used.

The two multiplexed illuminations with the lowest reconstruction error (highest rank) for the object spectra were determined using Equation 11. The spectra of these two illuminations and the corresponding spectra observed by the camera are shown in FIG. 4.

The three pairs of multiplexed illuminations that were found to have the highest three ranks are shown in FIG. 5. These illuminations were automatically found using the search algorithm and they have following desirable attributes:

(a) Full Utilization: The spectral response of each camera channel overlaps with at least one component light source (LED) in each of the two frames.

(b) Independence: For each camera channel, the spectrum of the illumination is different for the two frames.

(c) Normalization: The total power of illumination in a frame is comparable to that obtained when half the sources are on.

In order to understand how the parameters $K_s$ and $\alpha$ affect the performance of the spectral reconstruction algorithm, extensive simulations using the NYU common object spectra have been performed. Some of the simulation results are shown in FIG. 6.

Referring to FIG. 6, each line represents the RMS error in the recovered object spectra (using an optimal pair (N=2) of illuminations) as a function of a (regularization term), for a given $K_s$ (number of terms of Parkinnen basis). For all simulations, noise is added using a noise model estimated for the PointGrey Dragonfly Express camera is added. A similar set of simulations were done for N=3 frames. Surprisingly, however, the errors were not decreased. In order to realize the benefits of using a large number of frames, a large number of sources with distinct spectra are required. In this embodiment, multiple sources having different spectra and their on-off combination are used for reducing spectral reconstruction error. In a case of video of dynamic scenes, however, a large number of frames are required. This can be achieved using a high-speed camera. However, reduction of exposure time decreases the signal-to-noise ratio (SNR). For these reasons, just 2 frames and 5 types of light sources are used in this embodiment. With this configuration, it is possible to acquire a continuous spectral reflectance image that is reasonably smooth.

Multispectral Imaging System

FIG. 7 is a picture illustrating a multispectral imaging system according to an exemplary embodiment of the present invention.

Referring to FIG. 7, the multispectral imaging system according to an embodiment of the present invention includes a controller, a plurality of LED clusters that are illuminating a scene on the basis of control signal of the controller, and a camera for capturing an image of the scene under the control of the controller. In this embodiment, LEDs are used as the light sources as they are inexpensive, compact, and easy to control. In this embodiment, two identical LED clusters are installed, and each cluster consists of 5 kinds of LEDs: "white," "red," "amber," "green," and "blue" (Itswell.™.). One of the clusters is shown at bottom left area of FIG. 7. The total number of LEDs of the clusters is 12×12=144. The LEDs at the same locations in all cells are simultaneously controlled using a microprocessor (AVR™) (not shown). In this embodiment, the power spectra of the different types of LEDs are measured using a spectroradiometer (Luchem SPR-4001™). Also, a CCD camera with external trigger (Point-Grey Dragonfly Express) is used for capturing the scenes. This camera works stably at 120 fps. To increase image irradiance, the camera operates at 60 fps and acquires multispectral videos at 30 fps (N=2). The microprocessor controls the timing of the LED clusters and provides a synchronization signal to the camera. The radiometric response of each camera channel was calibrated using the known method.

The accuracy of the spectral estimation can be verified by using the MacBeth Color Checker chart. The number of Parkkinen basis functions $K_s$, as a parameter for the analysis, is 8. The smoothness parameter $\alpha$ is set to 64.0.

In FIG. 8, the known spectra (red solid lines) and the estimated spectra (dotted black lines) for a few of the color chips are shown. It is noted that the estimated and actual spectra match very well. Similar results are obtained for all the remaining chips on the chart. These results provided strong evidence that multispectral imaging system can measure full spectral reflectance with reasonable accuracy. FIG. 9 is a bar graph illustrating average reconstruction errors in RMS for Macbeth color chart.

A system for implementing the above multispectral imaging method is provided in an embodiment of the present invention, FIG. 10 is a block diagram illustrating a configuration of a multispectral imaging system according to an exemplary embodiment of the present invention.

Referring to FIG. 10, the multispectral imaging system includes a microcontroller which generates an on-off control signal according to an on-off combination and an operation control signal in synchronization with the on-off signal; a plurality of light sources which illuminates a scene on the basis of the on-off control signal; a camera which captures an image of the scene on the basis of the operation control signal, and a multispectral image generator which determines a plurality of spectral basis functions and weights of the basis functions, sums the values obtained by multiplying the spectral basis functions with corresponding weights, and determines a continuous spectral reflectance of the scene on the basis of the summation result.

According to an embodiment of the present invention, a multispectral imaging system includes an LED cluster for implementing the multispectral image capture system corresponding to the multiple light sources, an LED controller corresponding to the microcontroller, and a camera capturing system. The LED cluster is an illumination device consisting of LEDs having different wavelengths in the range between 400 and 700 nm. In this embodiment, 12 LED clusters are used, and each cluster is provided with maximum 81 LEDs. Also, 4 LED controllers are arranged for controlling the LED clusters, and each controller includes a master board and several slave boards. The master board controls the slave boards and processes user inputs. The slave controls the LED cluster on the basis of a control signal received from the master board.

FIG. 11 is a block diagram illustrating a multispectral imaging system according to an exemplary embodiment of the present invention.

Referring to FIG. 11, the LED controller includes a master hoard and multiple slave boards. The master board processes the user input so as to outputs control signals to the slave boards, and the slave boards control the LED clusters on the basis of the control signal.

FIG. 12 is a photograph illustrating the master board of FIG. 11. The master board is implemented with a serial communication function for transferring the control signal to the 3 slave boards, a synchronization function for synchronizing the LED clusters and camera by generating synchronization signal, and a remote control function for a user to directly control the slave boards using a computer. Although 3 slave boards are used in this embodiment, the number of the slave boards can be changed according to a number of light sources.

In this embodiment, an Atmel AVR series ATmega128 microprocessor is used as the master board. The ATmega128 is a lower power CMOS 8-bit microprocessor having AVR RISC structure such that most commands, except for division command, are executed at 1 clock cycle. The ATmega128 has a processing speed near 1 MIPS/MHz with an optimized power consumption. The AVR core is provided with rich commands together with 32 universal registers. All the 32 registers are directly connected to an Arithmetic Logic Unit (ALU) and can process two independent registers for 1 command at 1 clock cycle.

In FIG. 11, the multispectral imaging system is configured with 3 slave boards. Each slave board controls 4 LED clusters such that total 12 LED clusters can be controlled by 3 slave boards. As shown in FIG. 13, the slave board is provided with 1 ATmega2560, 36 10-bit buffers, and 4 demultiplexers for controlling 4 LED clusters. The Atmega2560 transfers LED on/off signals to 9 10-bit buffers through a Common Data Bus and sequentially controls the buffers and LEDs via the demultiplexers, i.e., 4 LED clusters are controlled via a single slave board.

The multispectral imaging system according to an exemplary embodiment of the present invention is provided with a serial communication unit. The serial communication unit enables communicating with devices through a small number of signal lines. The serial communications can be categorized into synchronous and asynchronous communications. The synchronous communication supports a high speed data transmission, but, has difficulty in synchronization between sender and receiver. The AVR supports a Universal Asynchronous Receiver/Transmitter (USART) which allows serial communication with another external device.

The code format of the USART serial communication consists of a start bit, five to nine data bits, zero or one parity bit, and one or two stop bits.

A data communication between the master and slave boards via the serial communication unit is described with reference to FIG. 14.

Referring to FIG. 14, the data are transmitted by 8 bits in AVR such that 2 times of data transmission is required for transmitting 16 bits. In the multispectral imaging system, a data packet consists of a first part of 8 bits and a second part of 8 bits. The first part is an identifier (ID) and the second part is pulse-width modulation (PWM) value. The first 4 bits of the first part indicate an LED controller (ID), and the second 4 bits of the first part indicate an LED cluster ID. The second part is used for setting the PWM value.

Although 12 LED clusters are used in this embodiment, the present invention is not limited to the number of LED clusters. A structure of the LED cluster is depicted in FIG. 15. As shown in FIG. 15, the LED cluster includes 9 pixels aligned in the form of a 3×3 array. Each pixel includes 6 kinds of LEDs and the rest space are arranged by LEDs having relatively low brightness. That is, "white," "red," "amber," "green," "turquoise," and "blue" LEDs are arranged in the cells L1 to L6 of each pixel, and the LEDs having colors (green, turquoise, and amber) with relatively low brightness are arranged in the cells L7 to L9. The LED cluster is fabricated in the form of a socket as shown in FIG. 16 so as to easily change the arrangement of the LEDs. The LED cluster is provided with wires that are connected to the respective LEDs so as to control the LEDs independently. That is, on/off control and brightness control can be made to each LED by using the LED controller In this embodiment, the PointGrey Dragonfly Express camera (see FIG. 17) is used as the RGB camera. The image sensor of Dragonfly Express camera is the ⅓" progressive scan CCD sensor of Kodak. This camera supports a resolution of 640×480 and 200 fps at the resolution of 640×480. This camera is provided with 9-pin IEEE1394 interface supporting a high frame rate at a data transmission rate of 800 Mbps.

Applications

Multispectral imaging can provide more measurements at each pixel than the conventional RGB imaging can. As a result, many vision applications stand to benefit. Although two example applications are presented hereinafter, the present invention is not limited thereto.

1. Object Detection/Segmentation

FIG. 18 shows an example of the multispectral imaging system's ability to separate metameric radiances. A star-shaped cosmetic patch has been applied to the skin of a women's cheek. Scene points on the cosmetic patch and on the skin are virtually indistinguishable in the RGB images. From FIG. 18, it is shown that the patch is clearer in a multispectral image (MSI) than in the conventional RGB image and the two illuminations-applied RGB image (RGB×2). The Receiver Operating Characteristic curve of FIG. 19 also shows the same result.

2. Relighting

Using the spectral reflectance s(.lamda.) estimated by the multispectral imaging system of the present invention at each scene point, the scene can be spectrally relit accurately. The relighting equation can be derived from the above equations as following:

$$I_m^{relit} = \sum_{k=1}^{K_s} \sigma_k g_{mk} \quad (12)$$

Equation (12) is a multispectral relighting Equation where $g_{mk}\int b_k(\lambda)c_m(\lambda)l^v(\lambda)d\lambda$, which is obtained from the characteristics of a virtual camera and a virtual light source.

A comparison has been made between a relighting result obtained from an RGB image and a multispectral relighting result.

The RGB relighting does not consider a reaction between the continuous spectral reflectance and the continuous illumination spectrum such that many artificial colors can produced by comparing with the real image obtained with a specific light source. For example, in FIG. 20, the illumination and the RGB relighting image of a pig and elephant dolls are difficult to distinguish from each other in comparison with the background. However, the multispectral relighting image acquired according to an embodiment of the present invention matches the acquired image well. This is because the color component of the illumination and the elephant and pig have distinct colors.

In addition to the above exemplary applications, the multi spectral imaging method and system of the present invention can be applied to various imaging fields such as optical field including microscopic and endoscopic imaging, whereby the present invention is not limited to specific field and system. Accordingly, any device or method adopting the multispectral imaging of the present invention is in the scope of the present invention.

The invention claimed is:

1. A multispectral imaging method comprising:
determining an on-off combination of a plurality of light sources illuminating a scene;
illuminating the scene with the light sources according to the on-off combination selected on the basis of a first control signal generated by a microcontroller; capturing an image of the scene by operating a camera on the basis of a second control signal synchronized with the first control signal; determining a plurality of spectral basis functions and weights of the spectral basis functions; and acquiring a continuous spectral reflectance by summing values obtained by multiplying the spectral basis functions and respective weights,
wherein the light sources comprise at least one light-emitting diode cluster and the camera comprises at least one RGB camera,
wherein the on-off combination of the light sources to be illuminated to the scene is determined by a weight matrix minimizing offset of a spectral reflectance of a predetermined representative material to the spectral basis functions, camera channel, spectra of the light sources, and number of frames (N).

2. The multispectral imaging method of claim 1, wherein the weights are determined using known spectral response characteristics of a camera and spectra to the plurality of lights sources.

3. The multispectral imaging method of claim 1, wherein the spectral basis functions are derived from a corresponding model showing linear characteristics to a spectral reflectance of the scene.

4. The multispectral imaging method of claim 3, wherein the spectral basis functions are eigenvectors of a correlation matrix derived from a database of spectral reflectances of Munsell color chips.

5. The multispectral imaging method of claim 1, wherein the continuous spectral reflectance is calculated by an equation:

$$s(\lambda) = \sum_{k=1}^{K_s} \sigma_k b_k(\lambda)$$

where $s(\lambda)$ is the continuous spectral reflectance, $\sigma_k$ indicates the weights, $b(\lambda.)$ indicates the spectral basis functions, and $K_s$ is a number of the spectral basis functions.

6. The multispectral imaging method of claim 1, wherein the light sources are characterized in that spectral response of each camera channel overlaps with at least one light source, the spectrum of the illumination is different for the frames, and a total power of illumination in a frame is comparable to that obtained when half the light sources are on.

7. A multispectral imaging system comprising: a microcontroller which generates an on-off control signal indicating an on-off combination of light sources illuminating a scene in a frame and generates an operation control signal in synchronization with the on-off control signal;
a plurality of light sources that turn on according to the on-off combination indicated by the on-off control signal to illuminate the scene, wherein the light sources comprise at least one light-emitting diode cluster;
a RGB camera which captures an image of the scene on the basis of the operation control signal;
and a multispectral image generator which determines a plurality of spectral basis functions and weights of the spectral basis functions, and acquires a continuous spectral reflectance by summing values obtained by multiplying the spectral basis functions and respective weights,
wherein the on-off combination of the light sources to be illuminated to the scene is determined by a weight matrix minimizing offset of a spectral reflectance of a predetermined representative material to the spectral basis functions, camera channel, spectra of the light sources, and number of frames (N).

8. The multispectral imaging system of claim 7, wherein the microcontroller comprises a light-emitting diode controller having a master board and at least one slave board, the master board controlling the slave board by processing an user input, and the slave board controlling on/off of the light sources according to control signals generated by the master board.

9. The multispectral imaging system of claim 7, wherein the spectral basis functions are derived from a corresponding model showing linear characteristics to a spectral reflectance of the scene.

10. The multi spectral imaging system of claim 9, wherein the spectral basis functions are eigenvectors of a correlation matrix derived from a database of spectral reflectances of Munsell color chips.

11. The multispectral imaging system of claim 7, wherein the light sources are characterized in that spectral response of each camera channel overlaps with at least one light source, the spectrum of the illumination is different for the frames, and a total power of illumination in a frame is comparable to that obtained when half the light sources are on.

12. A multispectral imaging method comprising: determining an on-off combination of a plurality of light sources illuminating a scene; illuminating the scene with the light sources according to the on-off combination selected on the basis of a first control signal generated by a microcontroller; capturing an image of the scene by operating a camera on the basis of a second control signal synchronized with the first control signal; determining a plurality of spectral basis functions and weights of the spectral basis functions; and acquiring a continuous spectral reflectance by summing values obtained by multiplying the spectral basis functions and respective weights, wherein the on-off combination of the light sources to be illuminated to the scene is determined by a weight matrix minimizing offset of a spectral reflectance of a predetermined representative material to the spectral basis functions, camera channel, spectra of the light sources, and number of frames (N).

13. The multispectral imaging method of claim 12, wherein the weights are determined using known spectral response characteristics of a camera and spectra to the plurality of lights sources.

14. The multispectral imaging method of claim 12, wherein the spectral basis functions are derived from a corresponding model showing linear characteristics to a spectral reflectance of the scene.

15. The multispectral imaging method of claim 14, wherein the spectral basis functions are eigenvectors of a correlation matrix derived from a database of spectral reflectances of Munsell color chips.

16. The multispectral imaging method of claim 12, wherein the light sources constitute at least one light-emitting diode cluster.

17. The multispectral imaging method of claim 12, wherein the continuous spectral reflectance is calculated by an equation:

$$s(\lambda) = \sum_{k=1}^{K_s} \sigma_k b_k(\lambda)$$

where $s(\lambda)$ is the continuous spectral reflectance, $\sigma_k$ indicates the weights, $b(\lambda)$ indicates the spectral basis functions, and $K_s$ is a number of the spectral basis functions.

18. The multispectral imaging method of claim 12, wherein the light sources are characterized in that spectral response of each camera channel overlaps with at least one light source, the spectrum of the illumination is different for the frames, and a total power of illumination in a frame is comparable to that obtained when half the light sources are on.

* * * * *